United States Patent [19]
White

[11] Patent Number: 5,337,257
[45] Date of Patent: Aug. 9, 1994

[54] MOVING VEHICLE CLASSIFIER WITH NONLINEAR MAPPER

[75] Inventor: Stanley A. White, San Clemente, Calif.

[73] Assignee: Rockwell International Corporation, Seal Beach, Calif.

[21] Appl. No.: 61,879

[22] Filed: May 17, 1993

Related U.S. Application Data

[63] Continuation-in-part of Ser. No. 697,563, May 9, 1991, abandoned.

[51] Int. Cl.$^5$ .............................................. G01S 15/06
[52] U.S. Cl. ................... 364/554; 364/553; 364/436
[58] Field of Search ................. 364/554, 571.04, 553, 364/571.07, 577, 436, 555; 455/63; 340/928, 933

[56] References Cited

U.S. PATENT DOCUMENTS

| | | | |
|---|---|---|---|
| 3,614,729 | 10/1971 | Fujimoto et al. | 340/38 |
| 3,794,966 | 2/1974 | Platzman | 340/51 |
| 4,141,072 | 2/1979 | Perreault | 364/553 |
| 4,315,319 | 2/1982 | White | 364/553 |
| 4,774,682 | 9/1988 | White | 364/554 |
| 4,789,941 | 12/1988 | Nunberg | 364/436 |
| 4,956,999 | 9/1990 | Bohannan et al. | 364/507 |

Primary Examiner—Jack B. Harvey
Assistant Examiner—Craig Steven Miller
Attorney, Agent, or Firm—H. Fredrick Hamann; George A. Montanye; Tom Streeter

[57] ABSTRACT

The moving vehicle classifier with nonlinear mapper provides a method and apparatus for estimating the presence of a target moving vehicle in a sensor environment through estimation and classification of the sensor data. Values are extracted from the sensor data and a target function of extracted values is generated. Integrated function values representative of known vehicles in various physical states are prestored in a reference library. An integral function for the target function data is generated and mapped into a number of the prestored reference integral functions which provides a typically nonlinear mapping function. A MMSE curve fit is applied to this nonlinear mapping function to form a scaling factor for use in generating a scaled function of the data. The scaled data function is then compared to scaled reference functions in the library and the most similar, or least dissimilar, reference is chosen as an estimation of what known vehicle the sensor data represents. The output of the apparatus can be presented as a classification or likelihood of classification, as preferred by the application of interest.

17 Claims, 7 Drawing Sheets

MOVING VEHICLE CLASSIFIER WITH NONLINEAR MAPPER

This application is a continuation in part of Applicant's parent application entitled "Classifier and Measurement Estimator," Ser. No. 07/697,563, filed May 9, 1991, now abandoned. The disclosure of the parent application is incorporated herein by reference.

BACKGROUND OF THE INVENTION

The present invention relates to apparatus and methods for classifying a moving vehicle, and has particular relation to such methods and apparatus which are simple, cheap, and compact, and have light weight and low power.

A moving land vehicle radiates seismic waves. A moving sea vehicle produces a bow wave and a wake. A rocket plume emits infrared radiation. All moving vehicles make noise. Metallic moving vehicles have a radar return signal which is different from that of the same vehicles when stationary. They also produce minute changes in the magnetic and gravitational field surrounding the vehicle. These and other emanations from a moving vehicle form, in total, the signature of the vehicle. The signature may be detected by IR detectors, seismometers, gravitometers, magnetometers, sonar and radar receivers, and other sensors.

Capturing the signature, while necessary, is only half the battle. The other half is interpreting the raw output of the sensors. A sudden increase in seismic energy may not indicate a passing vehicle. It may only be an animal, or the wind blowing an empty barrel down the road. It Is important to be able to filter out background signals, and to determine that It really was a vehicle which passed. It is likewise important to be able to tell the class of the vehicle: its kind, direction, speed, probable cargo, etc. In short, the vehicle must be classified both as a vehicle and as a particular class of vehicle, and this classification must be done in the presence of a confusing background.

The prior art has attempted to do so by first determining various characteristics of the purported vehicle: how far it depressed the ground, how far Its front wheels were from its rear wheels, etc. If the characteristics were absurd (for example, a road vehicle with a ground depression suitable for a tractor-trailer, but a wheelbase suitable for a bicycle), the conclusion was reached that something else was present (an elephant, perhaps). If both the ground depression and the wheelbase were suitable for a tractor-trailer, then we assume that was what was indicated.

Determining vehicle characteristics is a complicated process. On the other hand, it has been equally frustrating to try to match raw sensor output collected under field conditions with raw sensor output stored in a library collected from known vehicles under known conditions.

SUMMARY OF THE INVENTION

The present invention does away with the distinction between (a) comparing a moving vehicle's characteristics with a library of stored characteristics, and (b) comparing a moving vehicle's raw sensor output with a library of stored raw sensor outputs. Instead, the vehicle's signature is extracted from the raw sensor output and is compared with comparable library signature. A signature may be of two types, raw and processed. The present application uses the term "signature" to refer to either or both types.

A raw signature is the raw output of a single sensor. The raw output indicates a single value of some parameter at each moment of time. The outputs and the moments may be digital or analog, and one may be digital and the other analog.

A processed signature is the output from a processor, the inputs to which are one or more other signatures. A typical processed signature is a Fourier transform of a signature. While a raw signature has one component and one input, a processed signature may have more components than it has inputs, as when a sinusoid input produces amplitude and frequency outputs. It may have fewer components than it has inputs, as when two inputs produce their average output. It may have the same number of components as inputs, as when a sinusoid input produces phase output. It may even be a set of vehicle characteristics, as is known to the prior art, or a synthetic raw output of a synthetic (non-existent) sensor, based on the actual raw outputs of actual sensors.

The goodness-of-fit between the signature of the unknown vehicle and the library signatures of known vehicles is then determined. This goodness-of-fit may then be used to classify the unknown vehicle, both as truly being a vehicle and as to type, velocity, cargo, or other characteristic of interest to the worker. It finally may be used to give a numerical estimate that the detection or classification is accurate, and to give similar estimates for less likely (but still significant) possibilities. The method used to determine the goodness-of-fit is described below, in detail, in the section which is captioned "Detailed Description of a Preferred Embodiment".

DETAILED DESCRIPTION OF A PREFERRED EMBODIMENT

Figure 1:
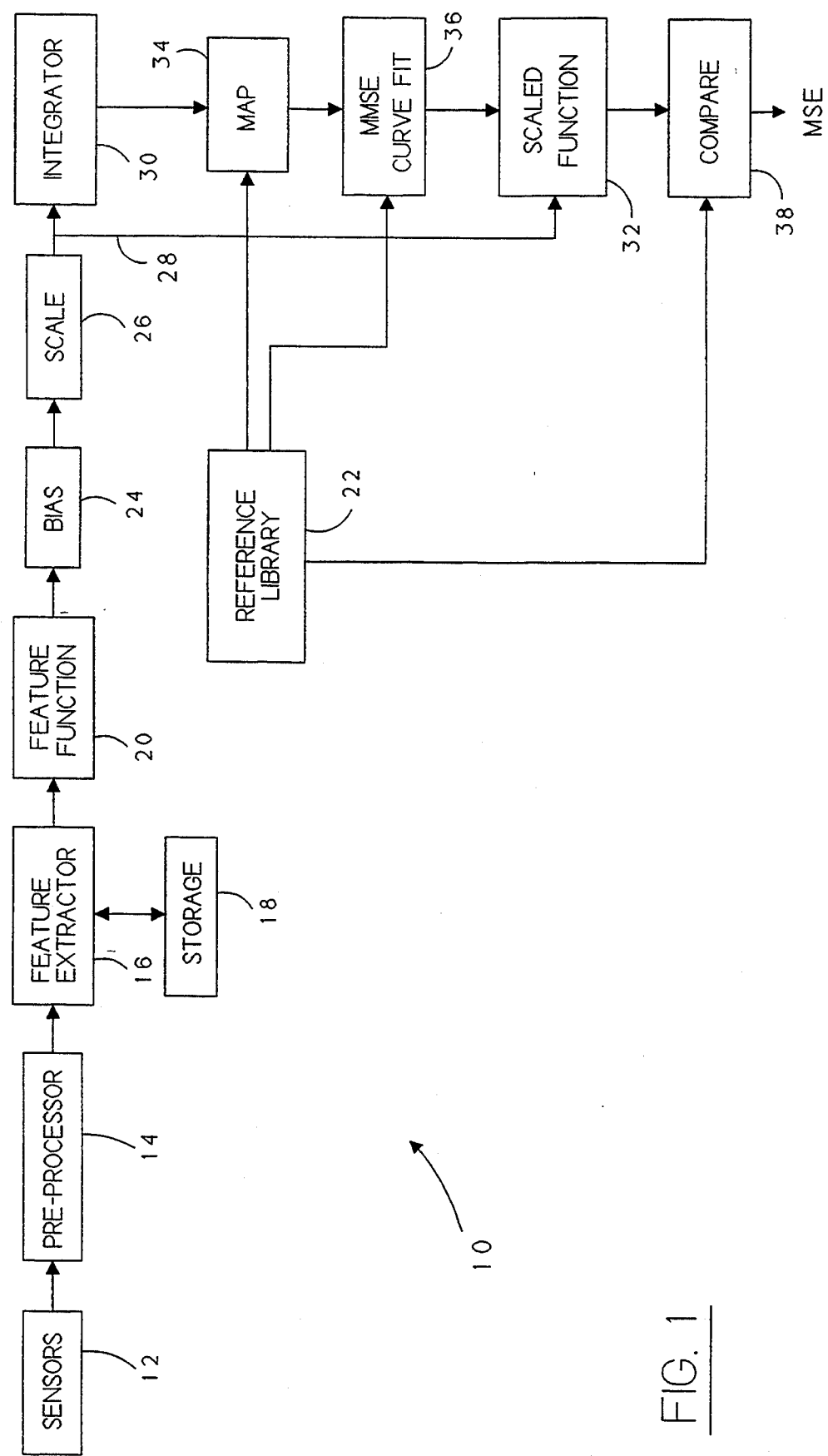
FIG. 1 illustrates a general schematic of a moving vehicle classifier constructed and operating according to the present invention.

A general schematic of a moving vehicle classifier according to the present invention is illustrated in FIG. 1. In FIG. 1, a classifier 10 is shown using one or more sensors 12 to scan a target moving vehicle, as by a seismometer, IR sensor, etc. The signature received from the sensors is generally preprocessed for known gain and detector characteristics in a preprocessor 14 and for noise removal and equalization. The preprocessing stage also includes an analog to digital conversion process, where needed, and in some embodiments the data can be stored in a memory or storage element, not shown, for future processing.

Signals of interest are extracted, by an extractor 16, from the signature. The extractor 16 provides a set of values u as an input for the next stage. The values are generally bounded by specific sensor or processing limits and can be defined as ranging from O to U2 in magnitude. The data are transferred to a storage device 18 for later recall, and thence to a function generator 20 where a function f(u) is generated. The storage device 18 may be omitted if desired.

Let:

$$0 \leq u \leq U2$$

$$f_{min} \leq f(u) \leq f_{max}$$

f(u) is a single valued function. f(u) may be, for example, an amplitude histogram, time varying waveform, power spectrum, cepstrum, or any other function known to those skilled in the art. The function is used to classify or identify the new input data in relation to a set of known reference vehicles for which reference functions are prestored in a reference library 22. The known functions are single-valued functions r(u) where:

$$0 \leq u \leq U1$$

$$r_{min} \leq r(u) \leq r_{max}$$

Let B1 be a bias value which positions r(u) on a pedestal above a baseline value. This assures a single-valued positive value to the function during processing. This decreases computational complexity and improves efficiency, since integrals performed during processing will always increase in value. An exemplary bias value B1 adjusts the reference signal r(u) by about five percent of its total peak-to-peak value differential. Such a bias would then be defined by the relationship:

$$\begin{array}{rcll} B_1 & = & -r_{min} & +1/20(r_{max} - r_{min}) \quad (1) \\ \text{Total} & & \text{Sets the reference} & \text{This then raises} \\ \text{bias} & & \text{on the baseline} & \text{that bias} \\ & = & 0.05 r_{max} - 1.05 r_{min} & \end{array}$$

Therefore, when the reference signal r(u) is added to the bias offset value B1, it can be described by the functional relationship:

$$\rho(u) = r(u) + B1 \quad (2)$$

Let:

$$K_1 = \frac{1}{\int_0^{U_1} \rho(u) du} \quad (3)$$

and $$R(u) = \int_0^u K_1 \rho(\delta) d\delta, \text{ where } R(U_1) = 1 \quad (4)$$

That is, K1 is a multiplicative constant which makes the integral of ρ(u) equal to unity and scales the integral for comparison with integrals for the new data values, discussed below, on a common magnitude scale; it is a self-consistent normalization factor.

In the same manner, a bias B2 is defined for use with the input data signal function f(u) such that:

$$B2 = 0.05 f_{max} - 1.05 f_{min} \quad (5)$$

Likewise, a pedestal φ(u), a multiplicative constant K2, and an integral are defined as:

$$\phi(u) = f(u) + B2 \quad (6)$$

$$K_2 = \frac{1}{\int_0^{U_2} \phi(u) du} \quad (7)$$

and $$F(u) = \int_0^u K_2 \phi(\delta) d\delta, \text{ where } F(U_2) = 1 \quad (8)$$

For convenience, an inverse integral function $u = F^{-1}(B)$ can also be defined, where B represents the value defined by the function F(u).

The biasing and scaling operations are performed in advance for the reference data. It is the biased, scaled, and integrated reference functions which are stored in the library 22, along with the bias and scale factors. The library 22 comprises one of several known storage devices, such as, but not limited to, a ROM circuit which can be easily addressed using the value of u for reading stored values. However, the input signals are biased, scaled, and integrated as received, before comparison to the library functions.

Returning to FIG. 1, each selected function f(u) output by the extractor 16, is transferred to a biaser 24. In the biasing element 24, the bias term B2 is computed, from the maximum and minimum signal values, and applied to the function data to form the biased function φ(u). The function φ(u) is transferred to the scaler 26 where K2 is computed and multiplied by φ(u), thereby providing a target first scaled function.

The target first scaled function data are next transferred along a common data bus 28, to both an integrator 30 and a scaler 32. The φ(u) data are integrated over the predetermined values for u from 0 to U2, to provide F(u). A scaled integrated function for F(u) data is computed in the integrator 32.

As discussed above, data from sensory observations of known vehicles are compiled in a database or library 22. The data are stored in the form of known functions (integrated functions and scaled density functions) for the known vehicles. These functions can be easily stored in an addressable element such as an electronic ROM circuit and recalled by simple addressing techniques.

Since both R(u) and F(u) are monitonically increasing functions having values that lie between 0 and 1, there exists a single-valued mapping on u such that:

$$R(u) = F(v); \ v = g(u); \text{ and } dv/du = dg(u)/du = g'(u)$$

The above relationships imply that an input signal segment can be mapped or modified to be exactly the same as the reference function. That is, there exists a relationship by which the input signal can have its features or parameters adjusted to exactly duplicate a particular reference function. If this mapping process is very simple, very few changes or adjustments are needed to the input data signals, then the data and the reference are considered similar. If the mapping operation requires more extensive alterations to the data segment signal to match the reference, then the two signals are considered dissimilar. Various degrees of similarity or dissimilarity can be defined to create a scale of relative "similarity" or likelihood for a signal match.

For a dissimilarity mapping, R(u) equals F(v), and F(v) in turn equals the function F[g(u)]. Therefore, a transformation function can be generated having an independent variable v which is given by:

$$v = g(u) = F^{-1}[R(u)] \qquad (9)$$

Using the above function, the function generated in the function generator 30 is mapped onto each of the known functions stored in the memory library 22. For some applications it may be desirable to only perform this mapping using a limited number of selected functions from the total number stored in the library 22. This will be true when speed is required, when the adjustment need only be coarse, or when accuracy requirements are modest. An example of this mapping process is illustrated in part in FIGS. 2 and 3.

Figure 2:
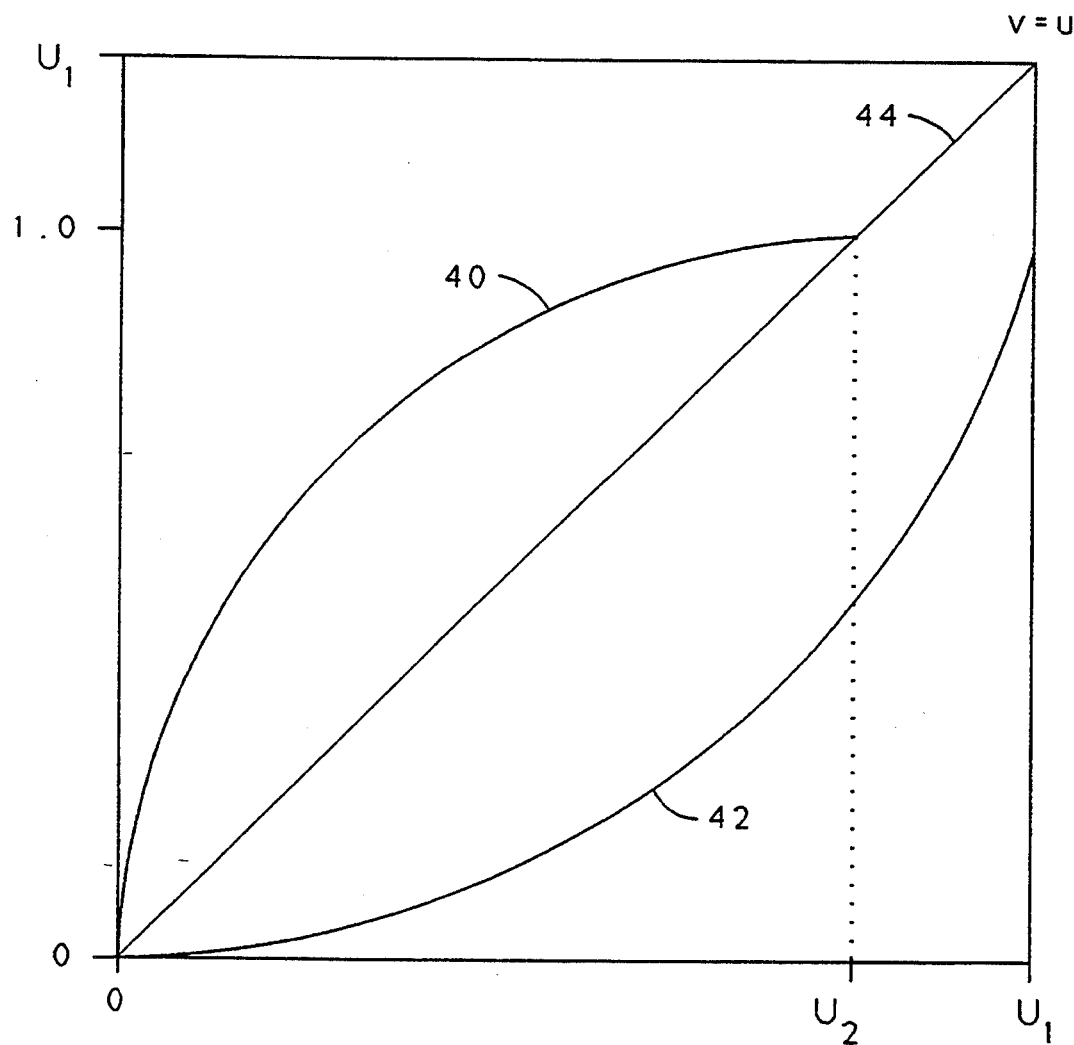
FIG. 2 illustrates the comparison of theoretical reference and data functions.

In FIG. 2, a graphical representation is presented for two hypothetical integration functions F(u) and R(u), labeled 40 and 42, for the incoming and stored reference data, respectively. These two functions are plotted on X-Y axis whose values represent u and v, where:

$$0 \leq u \leq U1 \text{ and } 0 \leq v \leq U2$$

It is clear that the two functions have different "v" values for a given "u" value, or put another way have differing "u" values for the same v. The mapping process for these two functions can be represented graphically by using the plot line for v=u to convert the value of R(u) at a common v with F(u) to the necessary value of v required to make g(u)=v for the same value of u as F(u). The results of this conversion mapping operation are illustrated in FIGS. 3a and 3b.

These figures assume a common normalization or maximum value of 1 for each variable scale. However, various ratios of the two scale values can also be used where desired, such as a value of v ranging from 0 to 1 while u ranges from 0 to 100. The ratio is included in the normalization step.

Figure 3A:
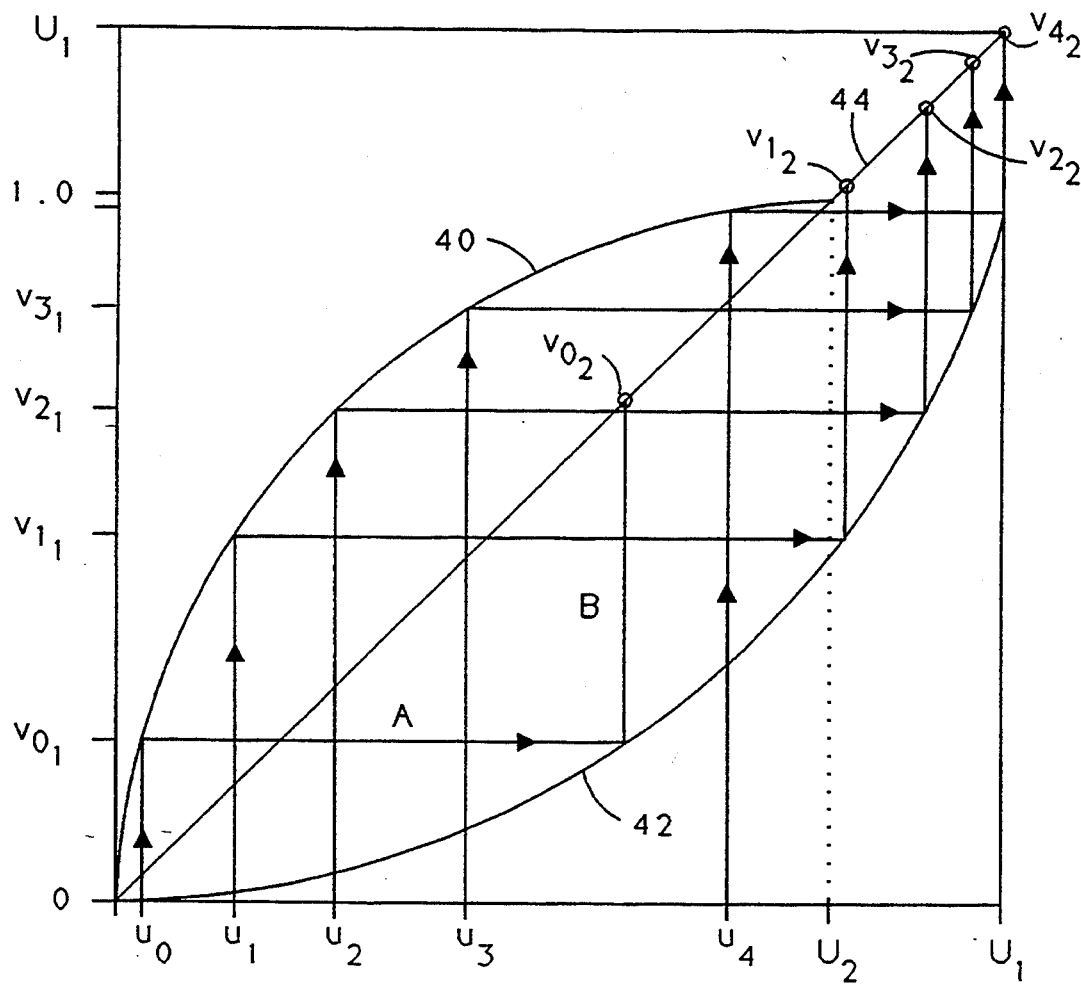
FIGS. 3a and 3b illustrate the generation of the mapping between the two functions of FIG. 2.
Figure 3B:
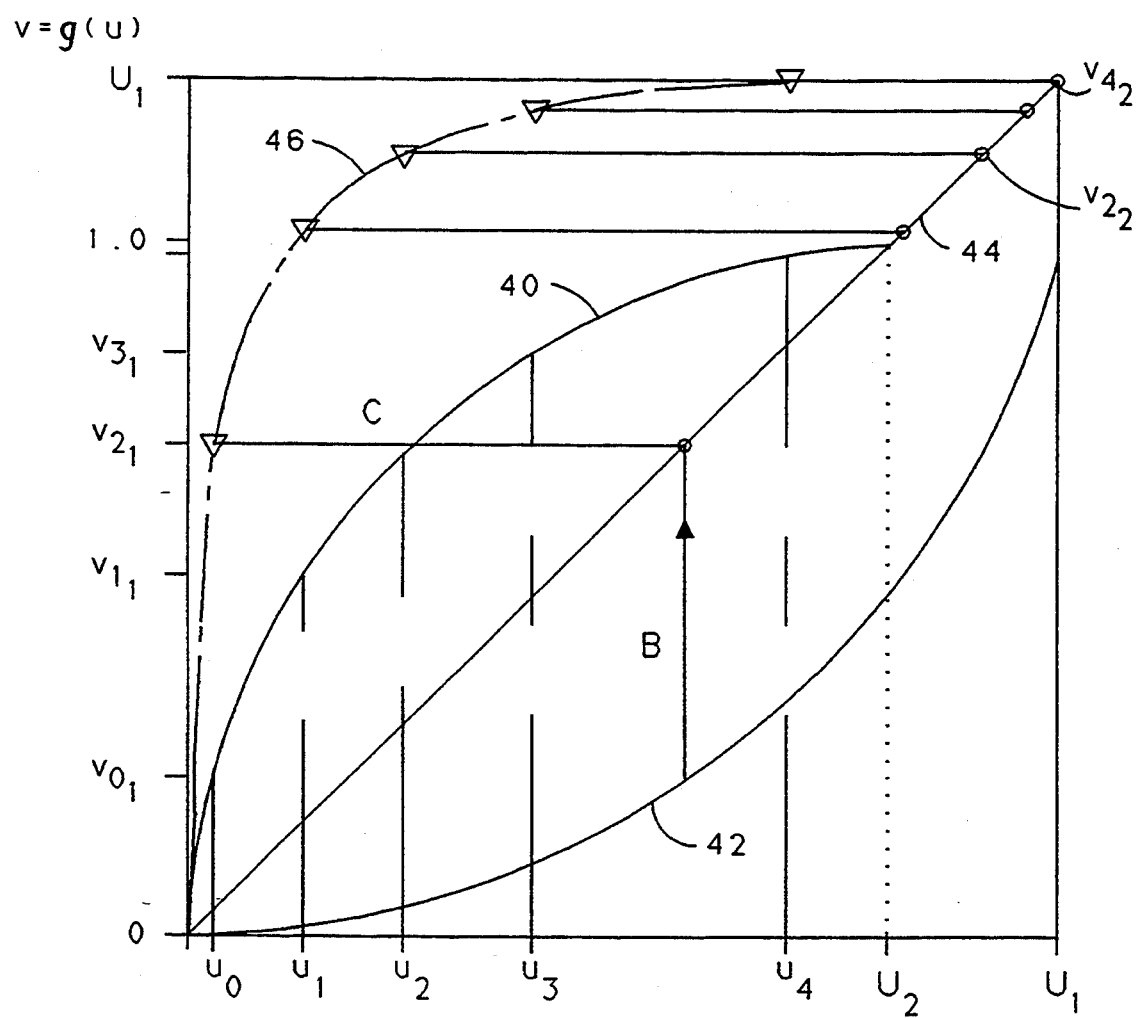

In FIG. 3a, an arbitrary position along the F(u) function curve 40 is chosen as a starting point and is called uo. A horizontal line A is drawn along a common v value, vo1, to the R(u) function curve 42. From this point (shown as a circle) on the R(u) curve 42, a vertical line B is drawn along a fixed u value to the v=u curve 44. This provides the value of v, here vo2, required to make g(u)=v at uo. This is seen in FIG. 3b, where a third value line C is extended along the value vo2 toward the Y-axis and terminated over the value of uo. This point, illustrated by a triangle, represents a point along the function g(u) where g(u)=F$^{-1}$[R(u)], the transformation desired. This process is repeated for other values of u (u1, u2 ... U1) and v (v11, v21, v31, ... U2) until a function for g(u), 46, is sufficiently mapped, dependent upon a desired degree of accuracy.

The resulting mapping function is a generally non-linear function of the necessary adjustments required for mapping the new data integration function F(u) into a given reference function stored in the library 22. Other mapping operations can be employed in the method of the invention but this mapping operation is employed for clarity in explaining the features of the invention. Unfortunately, the resulting nonlinear mapping function is highly complex, computation intensive, and impractical for most real time systems of interest. An alternate approach was, therefore, developed which greatly simplifies the classification process.

Returning to FIG. 1, the mapping function data are transferred to a minimum mean square error (MMSE) curve fitter 36 where it is scaled to a normalized value and processed using an MMSE technique. That is, the best mean-squared error fit for g(u) is obtained using one of several well known analytical tools such as, but not limited too, regression analysis. The minimum mean square error function is used to provide a scaling factor for the new data to constrain the data into the same approximate scale as the reference data. This provides a more efficient comparison, and, thus, faster and more accurate classification.

The MMSE values are transferred to a scaled density function element 32 which has received function data from the function element 20. The scaled density function element 32 computes or generates a density function of the function data and uses the MMSE values to scale the resulting density function which is then transferred to a comparator or comparison element 38.

The comparison element 38 receives scaled integrated function information for a given input data set and compares it to integrated function values stored in the reference library 22. This comparison is accomplished for each reference function corresponding to the function used to prepare the MMSE data. The comparison operation is generally a value by value comparison of stored data. This results in a difference value or set of differences for each comparison made. These difference values can be stored in memory (not shown) or otherwise analyzed. The reference function having the least difference with the data is selected as the most likely classification for the data. Where there are several references with substantially equal differences from the input data, the comparison information can be provided to other apparatus, or in conjunction with the output of other devices for further processing, as desired.

From the above description, definitions, and relationships, a unique transformation process is generated which adjusts an input data waveform or function to approximate a reference waveform or function. That is, the newly created transformation relationship allows the input data to be adjusted using a multiplicative correction or scaling factor along with other linear scaling and parameter shifting factors until the data function matches, or is substantially the same as, a stored reference function. The complexity of this adjusting process determines the estimation or likelihood of a correlation between the input or sensed data from the new vehicle and the reference vehicle as belonging to the same class.

From the above equations, the transformation between the data and reference functions is given by:

$$\begin{aligned}
r(u) &= \rho(u) - B_1 \\
&= (1/K_1)[dR(u)/du] - B_1 \\
&= (1/K_1)[dF(v)/du] - B_1 \\
&= (1/K_1)[dF(v)/dv](dv/du) - B_1 \\
&= (1/K_1)[K_2\phi(v)g'(u)] - B_1 \\
&= (K_2/K_1)[f(v)] + B_2]g'(u) - B_1 \\
&= (K_2/K_1)\{f[g(u)] + B_2\}g'(u) - B_1 \\
&= (K_2/K_1)[g'(u)]\{f[g(u)]\} + (K_2/K_1)B_2[g'(u)] - B_1
\end{aligned}$$

where $$(K2/K1)[g'(u)]$$

is a multiplicative correction factor;

$$g(u)$$

represents warping of the independent variable; and $$(K2/K1)B2[g'(u)] - B1$$

represents an additive correction term.

Therefore, using the present invention, any single-valued data signal segment can be mapped into any other single-valued signal segment by using three operations. First the independent variable is warped or adjusted for a fit. Second, a multiplication correction factor is used for scaling. Third, a variable biasing term, additive correction, is used.

The complexity of this mapping process is then measured by the deviation of the g(u) term from a reference such as a polynomial or exponential series. The simplest is a straight line. One dissimilarity measure between the data and the reference in the straight line case becomes:

$$D_1 = 1/U_1 \int_0^{U_1} [g'(u) - \overline{g'(u)} - d(u)]^2 \, du \tag{11}$$

where $\overline{g'(u)}$ represents the mean value of the derivative of g(u), and d(u) is an orientation or application dependent predictable term in $g'(u)$, such as known errors or error functions associated with the application. An example would be errors known for sensor detection at differing angles of observation.

However, instead of differentiating to obtain the value of g'(u), the ratio of the two bias offset functions $\rho(u)$ and $\phi(u)$ (as adjusted by their respective normalization factors K1 and K2) can be used. This is true because:

$$g'(u) = \frac{K_1}{K_2} \cdot \frac{[r(u) + B_1]}{[f(v) + B_2]} \tag{12}$$

with the predictable components for this relationship being $\rho(u) = \overline{g'(u)} + d(u)$. This means that a simple mapping relationship, defined as $\widetilde{r}(u)$, becomes:

$$\widetilde{r}(u) = (K1/K2)[\rho(u)]\{f[up(u)]\} + (K1/K2)B2 - \rho(u) - B1 \tag{13}$$

A second dissimilarity is measured according to the relationship:

$$D_2 = 1/U_1 \int_0^{U_1} [r(u) - r(u)]^2 \, du \tag{14}$$

The full mapping operation, defined as $\widetilde{r}(u)$, is performed according to the relationship:

$$\widetilde{r}(u) = \{f[g(u)] + B2\}(K1/K2)g'(u) - B1 \tag{15}$$

At the same time, a processing verification is performed according to the relationship:

$$(1/U_1) \int_0^{U_1} [r(u) - \widetilde{r}(u)]^2 \, du \approx 0 \tag{16}$$

A zero detection element within the comparison element 38 can perform this latter verification. If there is a problem with the processing of data and performing the mapping operations, this latter function will not be equal to zero. At this point, the processing can be interrupted, reset, re-initialized, or simply abandoned as inaccurate, depending upon the specific applications.

Once the values for D1 and D2 are determined for each reference signal in the library 22 of stored signals, the most likely match is represented by the reference signal generating the smallest values for both D1 and D2. The comparison device of FIG. 1 provides this information at its output.

While the above apparatus and procedure operate very effectively in many applications, further advantage can be achieved by replacing the system constraints imposed by using a mean fit during the mapping process. The use of a mean or mean squared function in the mapping element 34 can be replaced with elements which implement other mapping constraints such as, but not limited to, a polynomial function. This causes the mapping or alterations of the reference data to the input or sensed data to be more dynamic and capable of accommodating a greater variation in waveform response.

Figure 4:
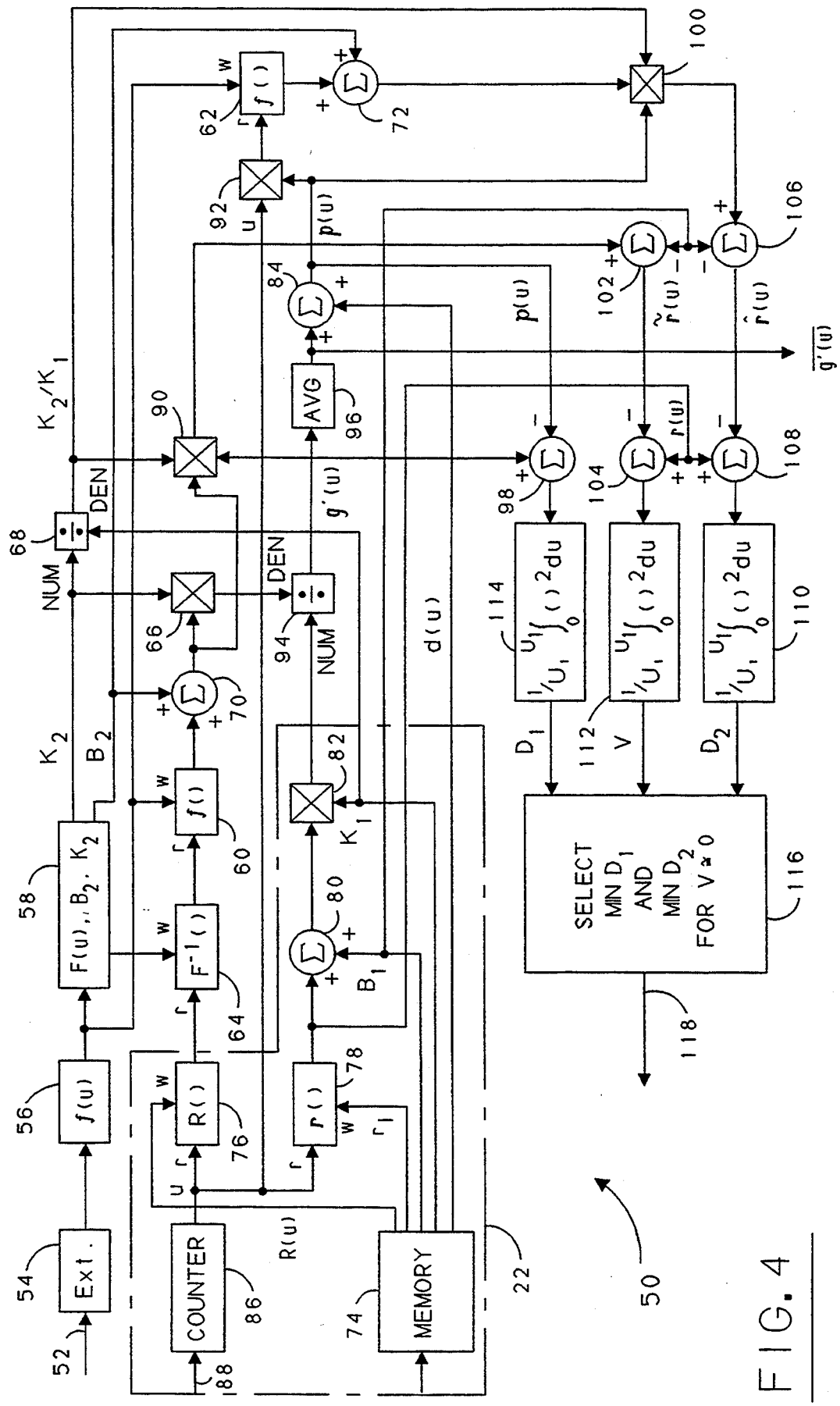
FIG. 4, illustrates a detailed schematic of the classifier of FIG. 1.

With the above general explanation of the operation of the invention in mind, a more detailed illustration of an exemplary embodiment for a moving vehicle classifier is shown in FIG. 4. The moving vehicle classifier of FIG. 4 performs the functions and operational steps discussed in relation to FIG. 1.

In FIG. 4, a moving vehicle classifier 50 is shown receiving data from preprocessing stages or sensors along an input bus 52 to an extractor 54. As previously illustrated in FIG. 1, the extractor 54 (16) separates incoming data of immediate interest from any excess data which can be stored for later analysis. As discussed above, the extracted values or data can also be stored for delayed processing.

The extracted data are transferred to the function element 56 where a representative function for the source of the extracted data is formed or compiled. In the exemplary embodiment of FIG. 4, the function element 56 generates an amplitude histogram of the received data. However, as previously stated, many other functions can be employed by the function element 56 within the teachings of the invention.

A histogram may be compiled with the use of random access memory devices. In this configuration, the magnitude of each incoming value is used as an address location within a memory storage device. The value magnitudes are bounded by predetermined resolution parameters or the limitations of the sensors, data rates, and preprocessing steps (such as digitization), and the addressing scheme shifts the magnitudes across a limited array of evenly spaced storage address or register values. That is, any incoming magnitude falls within a specified address range which represents a single magnitude level or a range of magnitudes. For each address access, a one is added to the contents of the chosen address location so that the total number of values from the extractor falling within a given magnitude range is recorded in one address location, over time.

The amplitude histogram data held in the function element 56 are transferred to a transformation factor element 58 and two transformers or function computation elements 60 and 62. The data are transferred in discrete segments at a sampling rate predetermined by the specific classification application. The transformation factor unit 58 receives the function data (segment of values) and computes the bias factor B2, from the relative magnitudes for the data values in the received segment, using the five percent figure from equation 5. The B2 offset is added to the function, f(u), data to provide the offset function $\phi(u)$. The multiplicative constant K2 is then computed by integrating $\phi(u)$ over the preselected sampling time and taking the inverse. This type of operation can be implemented using a series of storage registers, accumulators, or memory locations to store biased data and which is sequentially retrieved for integration and then passed through an inverter. The integrated function F(u) is also generated using the K2 and $\phi(u)$ data and then inverted to provide the inverse function $F^{-1}$.

Depending upon the specific classification application, the transformation factor unit 58 can comprise one or more memory elements, such as ROM circuits, which are configured to use the input function information as addresses for prestored values which are recalled as the F(u), K2, and $\phi(u)$ factors. This process works where the data are known to fall within certain value ranges and for limited numbers of variations.

At the same time, the function f(u) is transferred to the two transformation elements 60 and 62 which operate to apply the function relationship to data presented from other sources within the classifier 50. That is, these computational elements serve to use the function to process v and $\rho(u)$ data for adjusting the reference data to match the new input data. An exemplary embodiment for the transformers 60 and 62 are RAM circuits that "write" in the function information on a data input bus, w, which is subsequently "read" using other data values on an address bus, r. This in effect imposes the function relationship on the other data, thus, allowing transformation from f(u) to f(v) and f[$\rho(u)$], as discussed below.

The transformation factors and integrated function generated in the transformation factor element 58 are also transferred to other computational elements for the warping and modification process for the reference function R(u). The function F(u) is transferred to an inverse function processor 64, such as by being written into a RAM circuit for storage. The multiplicative constant K2 is provided to one input of a multiplier 66 and as a numerator input to a divider 68. The bias factor B2 is provided as a positive input to each of two summation elements or adders 70 and 72. These elements are easily realized using known adder circuits and employing inverters where subtraction is desired.

The reference library 22 of FIG. 1 is illustrated as a dashed outline 22 which comprises several elements for providing the reference function, bias, and scaling factors as required. These factors are typically stored in a memory or storage element 74, such as a RAM or ROM circuit, which is accessed as needed. The memory 74 is either loaded in advance or as new data are received by the sensors.

The integrated reference function R(u) is loaded into a function storage unit 76, such as a RAM. Values for the function r(u) are transferred into a storage or memory device 78, which is also typically a RAM circuit element. The reference factors B1 and K1 are presented as input values to a summation element or adder 80 and a multiplier 82, respectively, which are connected in series with the function unit 78. Data for the reference error function d(u) are also presented as a positive input to an adder 84. The B1 value is also transferred as a negative input to each of two adders 102 and 106, see below while the K1 factor is transferred as the denominator input to the divider 68.

The input to the function unit 76 is connected to the output of a counter 86 which is clocked at a predetermined rate by an outside clock source, not shown, through a clock signal input bus line 88. The counter 78 provides values at predetermined intervals which represent u and are used as an address selection signal for the function storage unit 76. That is, each value of u provided from the counter 86 selects a stored value for R(u) from the unit 76 which corresponds to that value of u. The selected value for the stored integrated reference function R(u) is provided as an address, r, to the inverse function unit 64 and selects as an output the value of $F^{-1}(u)$ which corresponds to $F^{-1}[R(u)]$, and which in turn equals g(u) or v.

The selected value for v is transferred as an output from the inverse function unit 64 to the function transformer 60 where it is used to address the function stored therein. This produces the value for the functional relationship f(v) which is provided as a second input to the adder 70. The adder 70 serially adds the value for B2, which is received from the factor element 58, to f(v) to form the biased function f[g(u)]+B2 which is transferred as a second input to the multiplier 66 and to a multiplier 90.

The counter 86 also provides values for u to the reference function memory 78 and a fourth multiplier 92. The memory 78 reads out function values r(u) in response to the u values, which are transferred to both the adder 80 and the adders 104 and 108. The function values are added to the precomputed reference bias B1 in the adder 80. The adder 80 output is transferred to a multiplier 82 where it is multiplied times the precomputed reference scaling factor K1. The output from the multiplier 82 is the product Ki[r(u)+Bi] which is provided as a numerator input to a second divider 94.

The multiplier 66 receives the scaling factor K2 from the factor element 58 and multiplies this times the output of the adder 70 to provide K2(f[g(u)]+B2) which is input as a denominator to the divider 94. The output of the divider 94 is the ratio described by equation 12 above (rather than true differentiation) and represents the value of g'(u). This value is transferred to three other locations as part of the estimation mechanization. The first location is the multiplier 90, the second is an averager 96 and the third is an adder 98.

The multiplier 90 is connected to receive the output of the divider 68, the adder 70 and the divider 94. The divider 68 receives the value of K2 as the numerator and as a second input the reference factor K1 from the memory 74 which is used to form the ratio of K1 and K2. This ratio is input to the multiplier 90 where it is combined with the output of adder 70 (f[g(u)]+B2) and the divider 94 (g'(u)) to form the products shown in equation 10 (without the bias B1), which are then transferred to the adder 102. The adder 102 also receives the bias value B1 from the memory 74 and subtracts this bias from the output of the multiplier 90 to form the full mapping function r̄(u) shown in equation 15 above. The values from the mapping function r̄(u) are transferred from the adder 102 to an adder 104 where they are subtracted from the values for the reference function received from the function unit 78.

At the same time, the averager 96 accumulates values for g'(u) as provided by the divider 94 and provides an average as an output to the adder 84, which can also be monitored on a separate output line. In the adder 84, the value of d(u) is received from the memory 74 (library 22) and added to the average from the averager 96 to provide ρ(u) which is transferred to the multiplier 92, the adder 98, and a multiplier 100. The multiplier 92 receives the value of u from the counter 86 which is multiplied times ρ(u) from the summer 84 to form the product uρ(u) which is used as a read address(es) for the storage element 62. Therefore, the output of the multiplier 92 reads values for the stored function f(u) data out of the memory element 62 and transfers them to the adder 72 where they are added to the bias factor B2 received from the factor element 58. The output from the adder 72 is then transferred to a second input of the multiplier 100.

The multiplier 100 also has a third input connected to the divider 68 from which it receives the ratio of K2 and K1. The multiplier 100 multiplies the output of the adders 72 and 84 times the ratio from the divider 68 and transfers the resulting product to an adder 106. In the adder 106, the value of B2 is received from the memory 74 and subtracted from the output of the multiplier 100 to produce the simple mapping function r̃(u) in as shown in equation 13 above.

The mapping function r̃(u) values output by the adder 106 are in turn transferred to an adder 108 which receives as a second, positive, input the value for the function r(u) from the library 22. The r̃(u) function values are subtracted from the r(u) function values and the difference is provided to an integrator 110. The integrator 110 first squares the received data and then integrates the data over the predefined 0 to U1 range and multiplies the result by the inverse of U1 as required by the relationship of equation 14 above, which provides the second dissimilarity measure D2.

At the same time, the output of the adder 104 is transferred to an integrator 112, and the output of the adder 98 is transferred to an integrator 114. The adder 98 subtracts the value of ρ(u) from g'(u) and the integrator 114 squares and integrates this difference to execute the data relationship shown in equation 11 above, which results in a value for first dissimilarity measure D1. The integrator 112 squares and integrates the difference between the r(u) and r(u) functions to perform the zero verification test illustrated by equation 16 above.

A selection element 116 receives the output values D1, D2, and "0" from the integrators 114, 112, and 110, respectively, and determines which function r(u) provides the minimum values for D1 and D2. Naturally, if the zero verification test fails, the selection element 116 provides no classification selection output, and instead provides an indication that there is an error in the system and a need for corrective action or resetting. The selection element 116 provides an output specifying which reference function is the appropriate classification or most likely classification of the input data on an output data bus 118.

While the above operation and apparatus advances the state of the art, it has been discovered that further advantage may be obtained by reversing the mapping process. That is, instead of mapping the input data to the references, each reference is mapped to the input data. This process provides a certain economy of computation and efficiency which decrease the computational steps and elements and provides a more efficient apparatus. This mapping process and an illustrative apparatus are discussed in relationship to FIG. 5.

Suppose as before that there is a function f(u) representing the newly sensed object and a stored reference function r(u) representing this object, having a range of values for the independent variable u as shown in equations 1–4 above. The signals will be biased using the bias factors B1 and B2, from equations 2 and 6 above, giving rise to biased functions described by the relationships:

$$\rho(u) = r(u) + B1 \text{ and } \phi(u) = f(u) + B2$$

The multiplicative scale factors K1 and K2 used to make the integrals of ρ(u) and f(u) equal to unity are defined by equations 3 and 7, respectively, above and their respective integrals by equations 4 and 8. Since both R(u) and F(u) are monitonically increasing functions that begin at 0 and end at unity, there exists a single-valued transform or mapping on an independent variable v, such that v = q(u) where:

$$0 \leq u \leq U2 \text{ and } 0 \leq v \leq U1,$$

and such that:

$$F(u) = R[q(u)] = R(v) \quad (16)$$

Taking the derivative of this latter relationship and applying the derivative chain rule we have:

$$dF(u)/du = \{dR[q(u)]/dv\}(dv/du) \quad (17)$$

By applying factor-by-factor substitution we have:

$$K2\ \phi(u) = K1\ \rho(v)q'(u) \quad (18)$$

or $$q'(u) = \frac{K_2}{K_1} \frac{\phi(u)}{\rho(v)} \quad (19)$$

By again defining an inverse integral function $R^{-1}$, as in equation 16 above, we have the relationships:

$$v = R^{-1}[F(u)] \text{ and } q(u) = R^{-1}[F(u)]$$

From the above relationships, a transformation or mapping process can be established which begins with the values of the reference function r(u) and generates a synthesized version [f̃(u)] of the input function f(u). If the computations employed to perform the mapping process are correct, the synthetic function f̃(u) will be equal to the input function f(u) exactly. In other words:

$$\begin{aligned}
\tilde{f}(u) &= \phi(u) - B_2 \\
&= (1/K_2)[dF(u)/du] - B_2 \\
&= (K_2/K_1)\{r[q(u)] + B_1\}q'(u) - B_2
\end{aligned} \quad (20)$$

Figure 5:
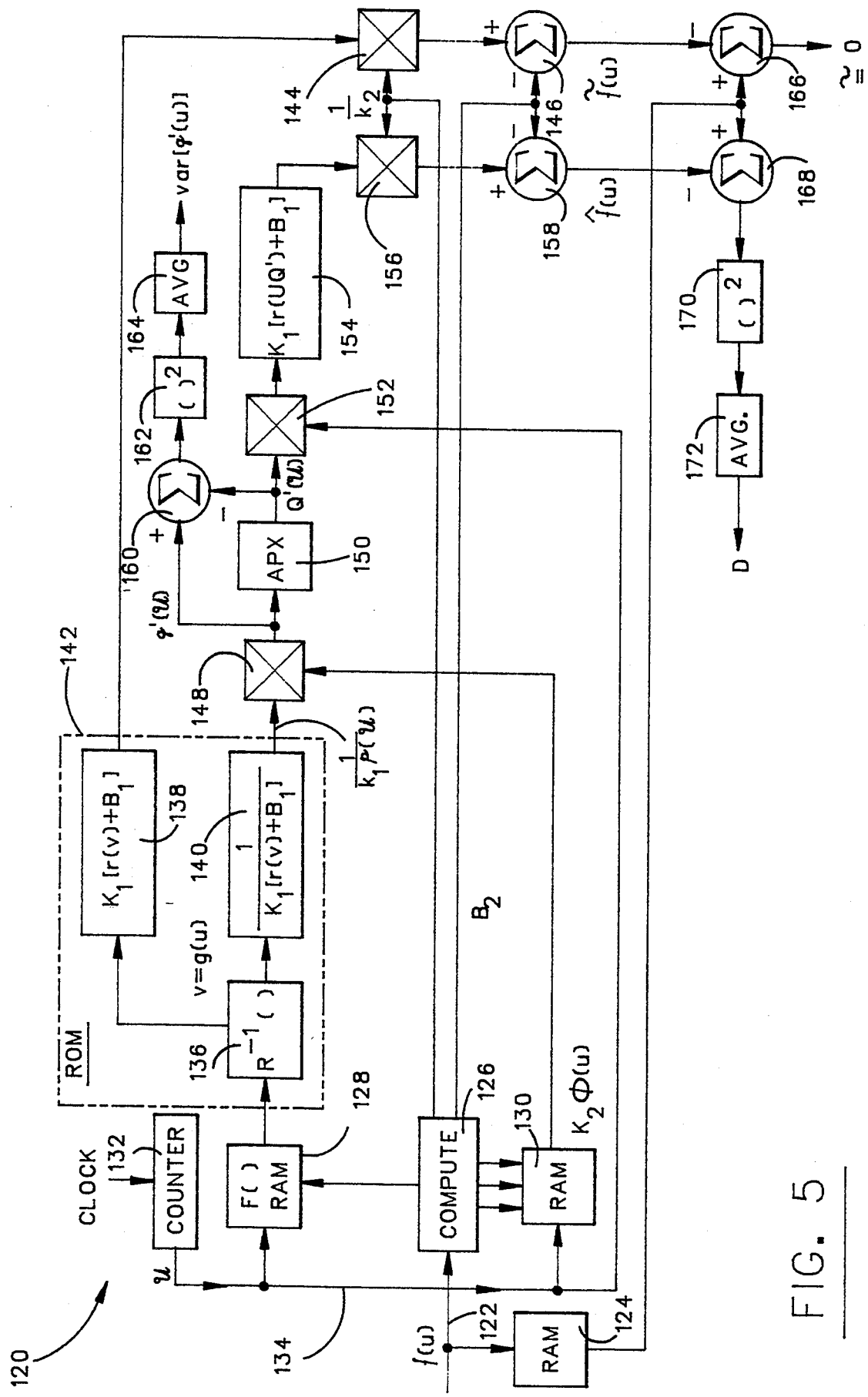
FIG. 5, illustrates a schematic of an alternate embodiment for the classifier of FIG. 1.

A function Q'(u) is then defined as a prescribed MMSE approximation of q'(u), such as a power series. If, for example, the approximation is a simple averaging function, then:

$$Q(u) = \int_0^u Q'(\delta)d\delta \qquad (21)$$

so that:

$$\tilde{f}(u) = (K1/K2)\{r[Q(u)] + B1\}Q' - B2 \qquad (22)$$

and one measure of the dissimilarity between r(u) and f(u) is the variance of q'(u), labeled as var[q'(u)] in FIG. 5. A second effective measure of dissimilarity, D, is the mean value of $[f(u) - \tilde{f}(u)]^2$. An embodiment of a mechanization of these dissimilarity relationships for adjusting the input data to match the stored function r(u) is illustrated in further detail in FIG. 5.

In FIG. 5, a dissimilarity measurement or classification apparatus 120, receives function data along an input data bus 122 and transfers this information to both a function storage element or RAM 124 and a transformation factor computation unit 126. The RAM 124 provides a storage element for the function f(u) of the new input data.

The transformation computation unit 126 uses the function information to generate the values for the integrated function F(u), and the K2 and $\phi$(u) factors. The values for the integrated function F(u) are transferred to a storage element or RAM 128 for subsequent recall. The bias and multiplicative factors $\phi$(u) and K2, are transferred to a storage element or RAM 130 for later recall.

As in the apparatus 50, a clock input signal is used to trigger a counter 132 which provides the values for u along an address bus 134. The values of u on the bus 134 are used to address the storage elements or RAMs 128 and 130 to recall the appropriate integrated function and transformation factor values in timed relationship with the processing of the reference function r(u) data.

The values for the integrated function F(u) are transferred to an inverted reference function device 136 where they are used as address values to read previously stored values for the inverse of the integrated reference function $R^{-1}(v)$. This provides the initial transformation from F(u) to R(v). The reference function data output by the device 136 are used to recall previously stored values for the reference functions K1$\rho$(u) and 1/K1$\rho$(u). These values are stored in memory elements, such as ROMs 138 and 140. Alternatively, all of the values for $R^{-1}$, $\rho$(u), and 1$\rho$(u) can be stored in a single ROM 142 which uses the addresses provided by the RAM 128 to generate the output values for K1$\rho$(u) and 1/K1$\rho$(u) directly.

The value for K1$\rho$(u) is transferred to one input of a multiplier 144 which also receives the inverse of the data multiplicative factor K2 as a second input. The multiplier 144 generates the product of these factors and transfers it as a positive input to an adder 146 where the bias value B2, as received from the element 126, is subtracted. This results in an addend output by the adder 146 which is the approximated function $\tilde{f}$(u).

At the same time, the value computed for 1/K1$\rho$(u) is transferred to a multiplier 148 where it is multiplied times the data factor K2$\phi$(u) to generate the function q'(u), as illustrated from the ratio in equation 19 above. The values of the function q'(u) generated in the multiplier 148 are transferred to an approximator, such as an averager, 150 during the processing of each data segment where they are accumulated to provide a corresponding value for Q'. This averaged value for Q' is provided as an input to a two input multiplier 152 where it is multiplied times u and transferred as an address to a memory or storage element 154, such as a ROM. The ROM or storage element 154 contains previously computed values for the function K1[r(uQ') + Bi] which are selected by inputting the values for Q'u as an address. The corresponding output is transferred as an input to a two input multiplier 156 which also receives the values for 1/K2 from the computation element 126. The resulting product from the multiplier 156 is provided as a positive input to the adder 158 which also receives the value of B2 from the computation element 126 which is subtracted to generate the function $\tilde{f}$(u).

The value for q'(u) is also transferred from the multiplier 148 to an input of an adder 160 which subtracts the value of Q' and transfers the results to a squaring device 162 and an averager 164. The output of the averager 164 provides the values for var[q'(u)], the variance of q'(u), which is one measure of dissimilarity for the generated function.

The output of the adder 146 is an estimate of the input f(u) and is provided as a one of two inputs to an adder 166 which also receives the input function data from the RAM 124. The output of the adder 146, $\tilde{f}$(u), is subtracted from the input function and provides the process verification; that is, this output should be zero.

The output of the adder 158, $\tilde{f}$(u), is provided as one of two inputs for an adder 168 which also receives the input function data from the RAM 124. The adder 158 output is subtracted from the input function data and the result transferred to a second squaring device 170 and then a second averager 172. The squared and averaged difference between the function for the data and the artificial function provides a second measure of dissimilarity, D, as discussed above.

The dissimilarity measure output by the averager 172 and the process verification from the adder 166 can be transferred to a selection means such as element 116 illustrated in FIG. 4. A selection element would determine when D or var[q'(u)] are at minimum values and would select the corresponding function as an output for those values.

Figure 6A:
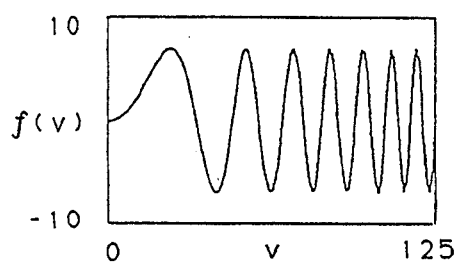
FIGS. 6a, 6b, and 6c, illustrate exemplary data and reference functions, and their integrals, extracted from moving vehicles, to be classified by the apparatus of FIG. 5.
Figure 6B:
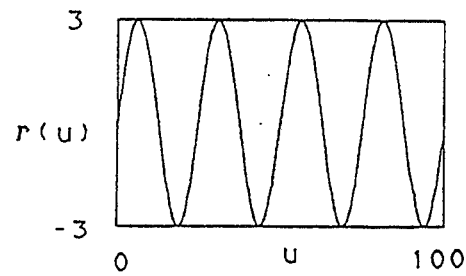

An exemplary application of the present invention can be further illustrated using some sample functions for the input and references. The exemplary functions and operational results at various stages are illustrated in FIGS. 6a through 6d. As illustrated in FIGS. 6a and 6b, a reference function of:

$$r(u) = 3\sin(8\pi u/100), \text{ where } 0 \leq u \leq 100$$

and an input function of:

$$f(v) = 7\sin[14\pi(v/125)^2], \text{ where } 0 \leq v \leq 125$$

are employed as two inputs to the apparatus of FIG. 5. From equations 1 though 7 above, the scaling factors for these representative functions are:

$$K_1 = \left[\sum_u \rho(u)\right]^{-1}, \text{ and } K_2 = \left[\sum_v \phi(v)\right]^{-1}$$

and their corresponding integrals are:

$$R(u) = K_1 \sum_k (k \leq u) \cdot \rho(k),$$

and $$F(v) = K_2 \sum_l (l \leq u) \cdot p(l)$$

Figure 6C:
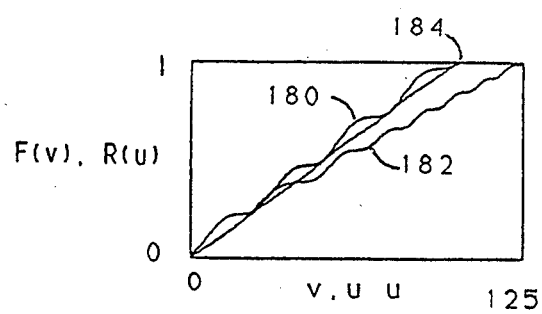

The latter integrals are drawn in FIG. 6c as lines 180 and 182, respectively, along with a line 184 representing the normalized values for the function u=U1, since the integrals are constrained to be single-valued functions having values between zero and one.

Figure 6D:
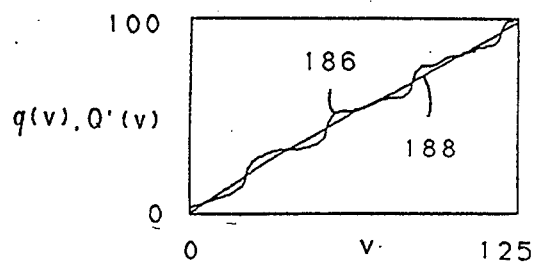
FIGS. 6d, 6e, and 6f, illustrate exemplary mapping, derivative, and output functions as generated by the apparatus of FIG. 5.
Figure 6E:
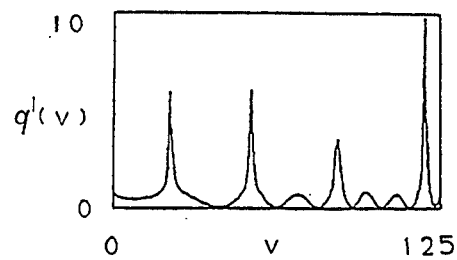

The mapping function q(v) becomes:

$$q(v) = \sum_u \{u \cdot [R(u) \leq F(v)]\} \cdot [R(u+1) \cdot F(v)]$$

which allows the input of a value for the independent variable, v, to read a corresponding value of the function F, which in turn recovers the value of the variable u which results in the same amplitude for the function R. This function is illustrated in FIG. 6d as line 186 along with a prescribed MMSE approximation 188, here a Jth order MMSE polynomial fit, Q'(v). From equation 19 we have the derivative of q(v):

$$q'(v) = \frac{K_2}{K_1} \cdot \frac{\phi(v)}{\rho(u)}$$

which is illustrated in FIG. 6e. As before, if the computations employed to perform the mapping process are correct, the synthetic function $\tilde{f}(u)$ will be equal to the input function f(u) exactly, that is (from equation 20):

$$\tilde{f}(u) = K1/K2\{r[q(u)] + B1\}q'(u) - B2$$

Figure 6F:
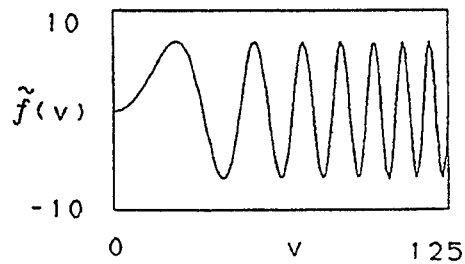

This function is illustrated in FIG. 6f. Notice that the function in FIG. 6f is substantially identical to that of the input function in FIG. 6a. It has been determined that in some applications this mapping can be accomplished with an error of as little as about $3 \times 10^{-13}$ percent.

The foregoing method is suitable for classifying a moving vehicle. With minor modification, it is suitable for classifying any phenomenon creating an anomaly in the output of any sensor or group of sensors detecting the phenomenon. Only two criteria need be satisfied. First, considering the phenomena of interest and the sensors used to detect them, can features of an unknown phenomenon be extracted from the raw output of the sensors?. Second, is it possible to build a library of comparable features of known phenomena?. The library can store unprocessed or partially processed sensor output from which features may be calculated, or it may store the features directly. The sensor output or features stored in the library may be gathered from actual vehicles moving past actual sensors, or it may be synthesized from a model of the phenomenon.

Industrial Applicability

The present invention is capable of exploitation in industry, and can be used, whenever it is desired to classify a moving vehicle, or whenever it is desired to classify any phenomenon creating an anomaly in the output of any sensor or group of sensors detecting the phenomenon. It can be made of components which, taken apart from one another, are entirely conventional, or it can be made by their nonconventional analogs.

While a preferred embodiment has been described in some detail, the true scope and spirit of the present invention are not limited thereto, but are limited only be the appended claims.

What is claimed is:

1. A method of classifying a target moving vehicle, the method comprising the steps of:
   (a) storing, in a memory, a plurality of known functions representative of a plurality of known moving vehicles;
   (b) sensing, with at least one sensor, a signature of the target vehicle;
   (c) extracting at least one signal of interest from the signature of the target vehicle;
   (d) generating a function for the extracted signals;
   (e) adding a bias to the generated function, thereby producing a biased function;
   (f) scaling the biased function so as to limit the integral thereof to a maximum value of unity, thereby producing a target first scaled function;
   (g) integrating the target first scaled function, thereby producing a target integrated function;
   (h) mapping the target integrated function to at least one of the known functions in the memory, thereby producing a mapping function;
   (i) performing a minimum mean squared error linear fit on the mapping function, thereby producing a relative scaling factor;
   (j) scaling the target first scaled function by multiplying it by the relative scaling factor, thereby producing a target second scaled function;
   (k) determining a measure of similarity between the target second scaled function and each of the known functions; and
   (l) indicating the known moving vehicles, the known functions of which produce a measure of similarity which exceeds a predetermined threshold.

2. The method of claim 1, wherein each known function comprises a function selected from the group consisting of time signature, time varying waveform, power spectrum, amplitude histogram, amplitude distribution, and cepstrum.

3. The method of claim 2, wherein the step of storing comprises the step of storing reference data in a random access memory using values for preselected function variables as storage addresses.

4. The method of claim 1, wherein the function generated for the extracted signals values comprises a function selected from the group consisting of time signature, time varying waveform, power spectrum, amplitude histogram, amplitude distribution, and cepstrum.

5. The method of claim 1, wherein the bias added to the generated function is determined by the steps of:
   (a) determining a difference between a maximum data value and a minimum data value for a predetermined segment of the generated function; and
   (b) multiplying the difference by a predetermined percentage.

6. The method of claim 5, wherein the predetermined percentage is about five percent.

7. The method of claim 1, wherein the step of scaling the biased function comprises the steps of:
   (a) integrating the biased function over a preselected domain, thereby producing an integral; and
   (b) dividing the biased function by the integral.

8. The method of claim 1, wherein the step of mapping the target integrated function to a known function comprises the step of generating a ratio between the target integrated function and the known function.

9. The method of claim 8, wherein the step of mapping comprises the steps of:
   (a) storing target integrated function data in a random access memory using values for preselected function variables as storage addresses; and
   (b) addressing the memory by applying functional variable values from the integrated functions.

10. The method of claim 1, wherein the step of performing a minimum mean squared error fit comprises the step of performing a linear regression of mapping function data so as to form a substantially linear scaling factor.

11. Apparatus for classifying a target moving vehicle, the apparatus comprising:
   (a) a memory containing a plurality of known functions representative of a plurality of known moving vehicles;
   (b) at least one sensor connected for sensing a signature of the target vehicle;
   (c) an extractor connected to the sensor for extracting at least one signal of interest from the signature of the target vehicle;
   (d) a generator connected to the extractor for generating a function for the extracted signals;
   (e) a biaser connected to the generator for adding a bias to the function, thereby producing a biased function;
   (f) a first scaler connected to the biaser for scaling the biased function so as to limit the integral thereof to a maximum value of unity, thereby producing a target first scaled function;
   (g) an integrator connected to the scaler for integrating the target first scaled function, thereby producing a target integrated function;
   (h) a mapper connected to the integrator and to the memory, for mapping the target integrated function to at least one of the known functions in the memory, thereby producing a mapping function;
   (i) a fitter connected to the mapper for performing a minimum mean squared error linear fit on the mapping function, thereby producing a relative scaling factor;
   (j) a second scaler connected to the fitter and to the first scaler, for applying the scaling factor to the target first scaled function, thereby producing a target second scaled function;
   (k) a comparator connected to the second scaler and to the memory, for comparing the target second scaled function with each of the known functions; and
   (l) an indicator connected to the comparator for indicating the known moving vehicles, the known functions of which produce a measure of similarity which exceeds a predetermined threshold.

12. The apparatus of claim 11, wherein the memory comprises a random access memory capable of storing data representative of a plurality of known and target second scaled functions.

13. The apparatus of claim 12, wherein the target second scaled functions and known functions comprise functions selected from the group consisting of time signature, time varying waveform, power spectrum, amplitude histogram, amplitude distribution, and cepstrum.

14. The apparatus of claim 11, wherein the memory comprises a random access memory capable of using values for function variables as storage addresses.

15. The apparatus of claim 11, wherein the generator comprises a random access memory having predetermined values stored therein at address locations corresponding to variable values.

16. The apparatus of claim 11, wherein the biaser comprises:
   (a) a differencer connected to the extractor for determining a difference in maximum and minimum values of the signals of interest;
   (b) a data storage device in which is stored a predetermined percentage value by which the bias is to offset data values; and
   (c) a multiplier connected to the differencer and the data storage device for providing the product of the difference and the percentage value, the product being the bias to be added to the function.

17. The apparatus of claim 11, wherein the first scaler comprises:
   (a) an integrator connected to the biaser for integrating the biased function over a preselected value range;
   (b) an inverter connected to the integrator for generating the multiplicative inverse of the integral; and
   (c) a multiplier connected to the integrator and the inverter for multiplying the function by the inverse integral.

* * * * *